United States Patent [19]

Bonifas

[11] 3,754,477

[45] Aug. 28, 1973

[54] CHAIN LINK

[75] Inventor: James L. Bonifas, Huntington, Ind.

[73] Assignee: Stellar Industries, Inc., Huntington, Ind.

[22] Filed: Dec. 28, 1971

[21] Appl. No.: 212,964

[52] U.S. Cl. .............................. 74/250 R, 74/255 R
[51] Int. Cl. ............................................ F16g 13/02
[58] Field of Search...................... 74/250 R, 250 S, 74/250 C, 255 R, 255 S, 255 C, 245 LP

[56] References Cited
UNITED STATES PATENTS
3,324,737  6/1967  Onulak.............................. 74/255 R
528,622  11/1894  Teale ................................ 74/255 R
2,450,565  6/1946  Saifyrd................................. 74/250

Primary Examiner—Leonard H. Gerin
Attorney—Verner Smythe et al.

[57] ABSTRACT

A chain link comprises a pair of spaced sidebars having opposed pairs of link pin receiving apertures adjacent the ends thereof and a bushing interconnecting one pair of apertures to define a link pin receiving passage. The ends of the bushing are provided with axial extensions which are seated in arcuate notches formed in the sidebars adjacent the apertures connected by the bushing. That portion of the bushing sidewall away from the axial extensions may be open to subtend an angle of approximately 90°.

7 Claims, 6 Drawing Figures

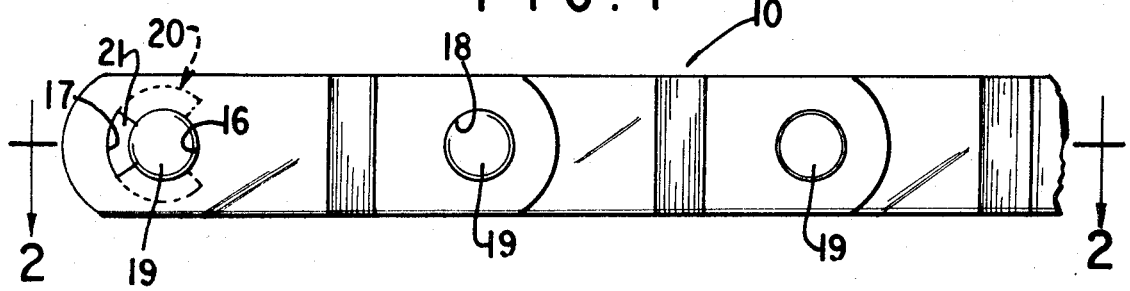
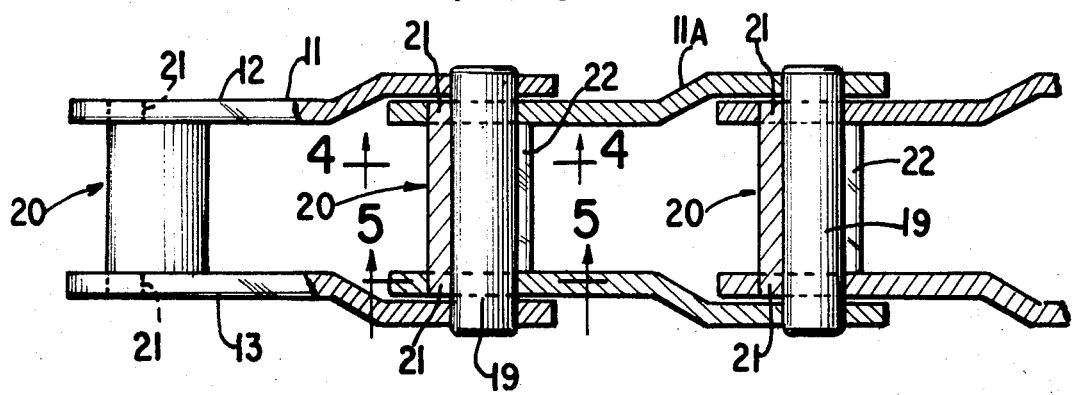
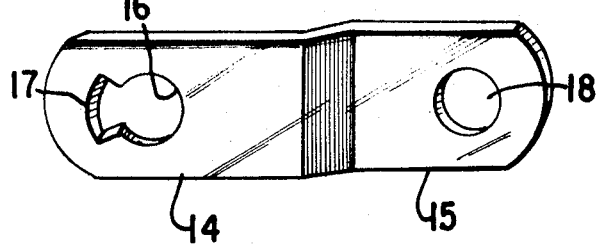
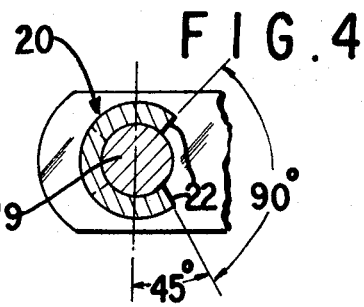
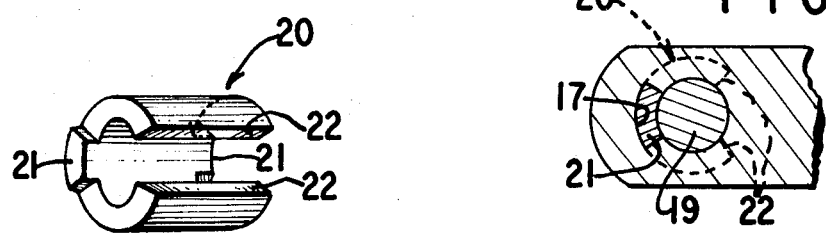
INVENTOR
JAMES L. BONIFAS
BY
Smythe & Moore
ATTORNEYS

CHAIN LINK

This invention relates to sprocket chains and particularly to an improved construction of a chain link for such a chain.

Relatively inexpensive drive or sprocket chains suitable for many types of transmission and conveying purposes are in great demand since they are capable of a wide variety of applications. Such chains are frequently used under difficult running conditions where maintenance is at a minimum. The chains are also used under outdoor conditions where abrasion factors become a problem, including those caused by the weather. One broad field of application of such chains occurs in various types of agricultural machinery. These chains must have sufficient strength and wearing properties for the intended purpose yet they must be easily fabricated. In order to increase the strength and wearing properties of such chains, the individual chain links have been heat treated individually. However, it is virtually impossible to guarantee the hardness in each of the components of such a chain link since the chain link is not subjected to a uniform heat treatment because of its configuration. Further, one of the main sources of wear from such a drive chain is caused by the continuous friction between the barrels or bushings of each chain link and the piece of the sprocket around which the chain moves. Various proposals have been advanced for improving the barrel or bushing construction so as to diminish sprocket wear. However, such proposals are generally not economically feasible since they significantly increase the cost of manufacturing the individual chain links and thus of the entire chain.

One of the objects of the invention is to provide an inproved chain link construction for a sprocket chain.

Another object of the invention is to provide a chain link construction wherein the hardness of each part of the chain link resulting from a heat treating process can be accurately predicted.

Another object of the present invention is to provide a chain link wherein the barrel or bushing construction is such as to significantly reduce sprocket wear.

In one aspect of the present invention, a chain link may comprise a pair of spaced sidebars with the sidebars having a first pair of apertures opposite each other adjacent corresponding ends thereof and a second pair of apertures adjacent the other corresponding ends thereof. There is a notch in each sidebar adjacent each aperture of one pair of apertures. A bushing, which is substantially cylindrical in configuration, has axial extensions on opposite ends thereof and is positioned between the sidebars so as to be aligned with said notched pair of apertures to define a link pin receiving passage. The bushing extensions are seated in said aperture notches to locate and secure the bushing in position.

These and other objects, advantages and features of the invention will become apparent from the following description and drawings which are merely exemplary.

In the drawings:

FIG. 1 is a side elevational view of a portion of a sprocket chain incorporating the chain links according to the present invention;

FIG. 2 is a sectional view taken along the line 2—2 of FIG. 1;

FIG. 3 is a perspective view of a sidebar of a chain link of the present invention;

FIG. 4 is a sectional view taken along the line 4—4 of FIG.2;

FIG. 5 is a sectional view taken along the line 5—5 of FIG. 2; and

FIG. 6 is an overall perspective view of the bushing according to the present invention.

Proceeding next to the drawings wherein like reference symbols incicate the same parts throughout the various views, a specific embodiment of the present invention will be described in detail.

As may be seen in FIG. 1, a sprocket chain indicated generally at 10 and incorporating the present invention comprises a plurality of chain links 11 which are also shown in FIG. 2. Each chain link 11 comprises a pair of spaced sidebars 12 and 13 having offset end portions 14 and 15 as may be seen in FIGS. 2 and 3. The sidebars 12 and 13 have opposed apertures 16 adjacent corresponding ends thereof with each of the apertures 16 having an arcuate notched or cut-out portion 17 at that edge of the aperture which is closest to the extreme end of the side bar. The notch 17 subtends an angle of approximately 90° and has the shape as may be best seen in FIG. 3.

A pair of opposed apertures 18 are formed adjacent the other ends of the side bars 12 and 13 for the purpose of receiving a link pin 19 passing therethrough. The link pin 19 of chain link 11 is connected to the next succeeding chain link 11A by means of a cylindrical bushing or barrel 20 which is aligned with the apertures 16 to form therewith a link pin passage.

The bushing 20 illustrated in FIG. 6 has axial extensions 21 at the ends thereof with these extensions having a cross section closely conforming to the shape of the notches 17. Thus, the axial extensions 21 are received snuggly within the notches 17 to interconnect the end portions 14 of the chain links 12 and 13. At the same time, the link pin 19 passes through the bushing 20 in the manner as shown in FIG. 2.

While the bushing 20 is substantially cylindrical in shape, a portion of its wall as indicated at 22 is cut away or open to subtend an angle of approximately 90°. This open portion is opposite from that portion of the bushing having the axial extensions 21.

Thus, each chain link 11 comprises four individual components, namely, a pair of side bars 12 and 13 interconnected at one end by a link pin 19 and at the other pin by a bushing 20. With this construction, each component of the chain link can be heat treated individually. By the individual heat treatment of each of these components, the Rockwell hardness of each of these components can be virtually guaranteed and can be precisely predetermined. In this manner, the strength and wearing characteristics of each chain line and, accordingly, of the entire sprocket chain are thus significantly improved.

As may be seen in FIGS. 4 and 5, the center of the bushing 20 comes approximately 45° past the center line of the link pin 19. This relationship will position the bushing on the working pitch diameter of the sprocket so that no cutting edges will come within contact of the faces of the sprocket 8.

The offset sidebar construction utilized in the sprocket chain disposed herein has the advantage of keeping the chain in alignment with respect to the sprocket.

It will be understood that various details of construction and arrangement of parts may be made without departing from the spirit of the invention except as defined in the appended claims.

What is claimed is:

1. A chain link comprising a pair of spaced elongated sidebars, said sidebars having a first pair of apertures opposite each other adjacent corresponding ends thereof and a second pair of apertures adjacent the other corresponding ends thereof, there being a notch in each sidebar adjacent each aperture of one pair of apertures, said notch being keystone shaped with sidewalls thereof diverging outwardly, a bushing having axial extensions on opposite ends thereof and positioned between said sidebars aligned with said notched pair of apertures to define therethrough a link pin receiving passage, the bushing extensions being shaped so that when seated in said aperture notches to locate and inhibit said bushing from movement in both longitudinal directions relative to said sidebars.

2. A chain link as claimed in claim 1 wherein the end walls of said notches in the sidebars are arcuate.

3. A chain link as claimed in claim 2 wherein the cross section of the bushing extensions conforms to the shape of the notch so that the extension is securely received therein.

4. A chain link as claimed in claim 1 wherein said notch extends equally on both sides of the longitudinal center line of its aperture.

5. A chain link as claimed in claim 1 wherein the sidewalls of said notch subtends an angle of approximately 90° relative to each other.

6. A chain link as claimed in claim 1 wherein the ends of the sidebars opposite the notched aperture ends are offset.

7. A chain comprising a plurality of links, each of which is composed of a pair of elongated spaced sidebars, said sidebars having a first pair of apertures opposite each other adjacent corresponding ends thereof and a second pair of apertures adjacent the other corresponding ends thereof, there being a notch in each sidebar adjacent each aperture of one pair of said apertures, the ends of said links opposite the end having said apertures with notches being offset outwardly relative to the other end, said notches being keystone shaped with side walls thereof diverging outwardly, bushings having axial extensions on opposite ends thereof and positioned between said sidebars, said extensions being aligned with said notched pair of apertures to define a link pin receiving passage therethrough, the bushing extensions being seated in said notches adjacent said apertures to locate and secure said bushing in position, said offset ends covering the apertures and bushings of the preceding link so as to retain said bushings from axial movement, and said notches inhibiting movement in both longitudinal directions relative to its sidebars.

* * * * *